(12) United States Patent
Shimizu et al.

(10) Patent No.: US 9,596,409 B2
(45) Date of Patent: Mar. 14, 2017

(54) IMAGING MODULE AND ELECTRONIC APPARATUS

(71) Applicant: FUJIFILM Corporation, Tokyo (JP)

(72) Inventors: Motokazu Shimizu, Saitama (JP); Yukihiro Kaneko, Saitama (JP); Yoshiyuki Takase, Saitama (JP); Tatsuya Fujinami, Saitama (JP); Manabu Tobise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/990,341

(22) Filed: Jan. 7, 2016

(65) Prior Publication Data

US 2016/0119545 A1 Apr. 28, 2016

Related U.S. Application Data

(63) Continuation of application No. PCT/JP2014/067854, filed on Jul. 4, 2014.

(30) Foreign Application Priority Data

Aug. 1, 2013 (JP) ................................. 2013-160624

(51) Int. Cl.
*H04N 5/232* (2006.01)
*G02B 7/08* (2006.01)
(Continued)

(52) U.S. Cl.
CPC .......... *H04N 5/23258* (2013.01); *G02B 7/08* (2013.01); *G02B 27/646* (2013.01); *G06T 5/003* (2013.01);
(Continued)

(58) Field of Classification Search
CPC .................... G02B 27/646; G02B 7/08; G06T 2207/20201; G06T 5/003; G06T 7/0018;
(Continued)

(56) References Cited

U.S. PATENT DOCUMENTS 8,792,166 B2 * 7/2014 Watanabe ............... G03B 5/02
359/554
2006/0083503 A1 * 4/2006 Fukai ................... G02B 27/646
396/55
(Continued)

FOREIGN PATENT DOCUMENTS

JP 2010-21985 1/2010
JP 2010-88088 A 4/2010
(Continued)

OTHER PUBLICATIONS

International Search Report for PCT/JP2014/067854 mailed on Sep. 22, 2014.
(Continued)

*Primary Examiner* — Amy Hsu
(74) *Attorney, Agent, or Firm* — Birch, Stewart, Kolasch & Birch, LLP

(57) ABSTRACT

An imaging module (100) includes a lens unit (11) that includes a lens group, and an imaging element unit (13) that is fixed to the lens unit and includes an imaging element. The lens unit (11) includes: a focus drive unit; first and second image blur-correction drive units; a first connecting portion (37A) that is electrically connected to the imaging element unit; a first wiring portion that electrically connects the focus drive unit, the first image blur-correction drive unit, and the second image blur-correction drive unit to the first connecting portion; a second wiring portion that is electrically connected to only a part of a plurality of wires of the first wiring portion; and a plurality of second connecting portions (59) that are electrically connected to the second wiring portion.

19 Claims, 12 Drawing Sheets

(51) Int. Cl.
  *H04N 5/225* (2006.01)
  *G02B 27/64* (2006.01)
  *G06T 5/00* (2006.01)
  *G06T 7/00* (2006.01)

(52) U.S. Cl.
  CPC ......... *G06T 7/0018* (2013.01); *H04N 5/2252* (2013.01); *H04N 5/2254* (2013.01); *H04N 5/2257* (2013.01); *H04N 5/23212* (2013.01); *G06T 2207/20201* (2013.01)

(58) Field of Classification Search
  CPC .. H04N 5/2252; H04N 5/2254; H04N 5/2257; H04N 5/23258
  See application file for complete search history.

(56) References Cited

U.S. PATENT DOCUMENTS

| | | | |
|---|---|---|---|
| 2007/0248344 A1* | 10/2007 | Santo | G02B 7/023 396/91 |
| 2008/0074504 A1* | 3/2008 | Sekino | G02B 13/0035 348/208.99 |
| 2009/0180021 A1 | 7/2009 | Kikuchi et al. | |
| 2010/0085474 A1 | 4/2010 | Morita | |
| 2011/0013283 A1* | 1/2011 | Sato | G02B 27/646 359/557 |
| 2011/0102665 A1* | 5/2011 | Takei | G02B 7/08 348/373 |
| 2011/0182566 A1* | 7/2011 | Watanabe | G03B 5/00 396/55 |
| 2013/0038783 A1 | 2/2013 | Shimizu et al. | |
| 2013/0223829 A1* | 8/2013 | Nakayama | H02K 5/04 396/55 |
| 2013/0321917 A1* | 12/2013 | Nakayama | G02B 27/646 359/557 |

FOREIGN PATENT DOCUMENTS

| | | |
|---|---|---|
| JP | 2011-158551 A | 8/2011 |
| JP | 2013-38628 A | 2/2013 |
| JP | 2013-88525 A | 5/2013 |

OTHER PUBLICATIONS

Written Opinion of the International Searching Authority for PCT/JP2014/067854 mailed on Sep. 22, 2014.

\* cited by examiner

IMAGING MODULE AND ELECTRONIC APPARATUS

CROSS-REFERENCE TO RELATED APPLICATIONS

This application is a Continuation of PCT International Application No. PCT/JP2014/067854 filed on Jul. 4, 2014, which claims priority under 35 U.S.C §119 (a) to Japanese Patent Application No. 2013-160624 filed on Aug. 1, 2013. Each of the above application(s) is hereby expressly incorporated by reference, in its entirety, into the present application.

BACKGROUND OF THE INVENTION

1. Field of the Invention

The present invention relates to an imaging module and an electronic apparatus.

2. Description of the Related Art

A small and thin imaging module is mounted on a portable electronic apparatus such as a mobile phone having an imaging function. The imaging module has a structure in which a lens unit in which an imaging lens is assembled is fixed to an imaging element module in which an imaging element, such as a charge coupled device (CCD) image sensor or a complementary metal-oxide semiconductor (CMOS) image sensor, is assembled (JP2013-88525A). Further, in recent years, the number of pixels of an imaging element has been increased, and an imaging element, which has a large number of pixels equal to or larger than 3 to 10 million, has been widely used instead of an imaging element that has a small number of pixels of about 1 to 2 million.

JP2010-21985A and JP2010-88088A disclose a technique that automatically aligns the lens unit with an imaging element unit and automatically fixes the imaging element unit to the lens unit. In this technique, an image of a measurement chart is picked up by the imaging element while the lens unit is moved in a direction of an optical axis after the lens unit and the imaging element unit are set to initial positions; and adjustment distances allowing the lens unit and the imaging element unit to correspond to target positions are obtained from the obtained image. The positions of the lens unit and the imaging element unit are adjusted according to the obtained adjustment distances, and the lens unit and the imaging element unit are fixed to each other by adhesion while being aligned with the target positions.

SUMMARY OF THE INVENTION

In lens units disclosed in JP2010-21985A and JP2010-88088A, a lens unit and an imaging element unit are in a separated state when a control unit aligns the lens unit with the imaging element. When the focus of the lens unit is adjusted in this separated state, the control unit makes probe pins come into contact with electrical contacts, which are provided on the outer peripheral surface of the lens unit, to input a driving signal to a focus adjustment drive unit.

Since an imaging element having a small pixel pitch is used in an imaging module of recent years, the size of a lens unit is also reduced to about several mm so as to correspond to the size of the imaging element. For this reason, since it is difficult to increase the area of adjustment terminals, the adjustment terminals need to be aligned with probes, which are to be electrically connected during adjustment, with high accuracy. As a result, an increase in the cost of an apparatus for manufacturing an imaging element unit is caused and manufacturing steps become complicated.

An object of the invention is to provide an imaging module that can reliably perform probing despite the use of a lens unit reduced in size and allow a lens unit and an imaging element unit to be fixed to each other with high accuracy, and an electronic apparatus including the imaging module.

The invention has the following structure.

(1) An imaging module including:
  a lens unit that includes a lens group; and
  an imaging element unit that is fixed to the lens unit and includes an imaging element,
  wherein the lens unit includes
    a focus drive unit that drives at least a part of a plurality of lenses of the lens group in a direction of an optical axis of the lens group,
    a first image blur-correction drive unit that drives at least a part of the plurality of lenses of the lens group in a first direction present in a plane perpendicular to the direction of the optical axis of the lens group,
    a second image blur-correction drive unit that drives at least a part of the plurality of lenses of the lens group in a second direction crossing the first direction present in the plane perpendicular to the direction of the optical axis of the lens group,
    a first connecting portion that is electrically connected to the imaging element unit,
    a first wiring portion that electrically connects the focus drive unit, the first image blur-correction drive unit, and the second image blur-correction drive unit to the first connecting portion,
    a second wiring portion that is electrically connected to only a part of a plurality of wires of the first wiring portion, and
  a plurality of second connecting portions that are electrically connected to the second wiring portion.

(2) An electronic apparatus including the imaging module according to (1).

According to the invention, since the number of second connecting portions of a second wiring portion connected to drive units can be minimized, the degrees of freedom in the arrangement pattern, size, and the like of the second connecting portions are increased. Even though a lens unit reduced in size is used, reliable probing is performed by this structure.

DESCRIPTION OF THE PREFERRED EMBODIMENTS

An embodiment of the invention will be described in detail below with reference to the drawings.

<Structure of Imaging Module>

Figure 1:
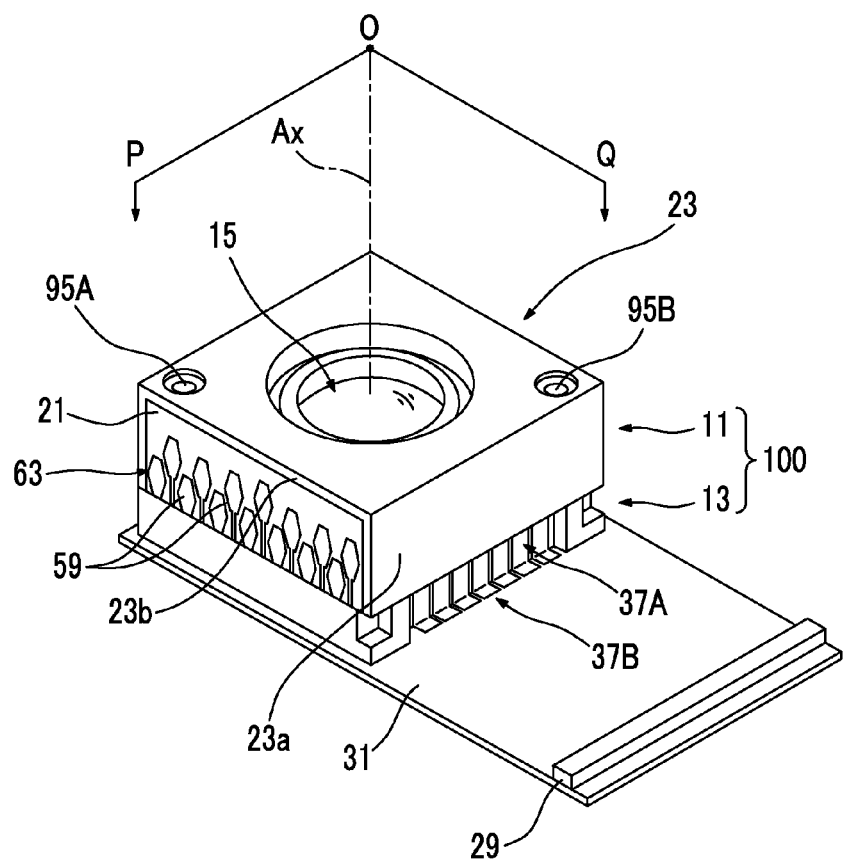
FIG. 1 is a view showing an embodiment of the invention and is a perspective view of the appearance of an imaging module.
Figure 2:
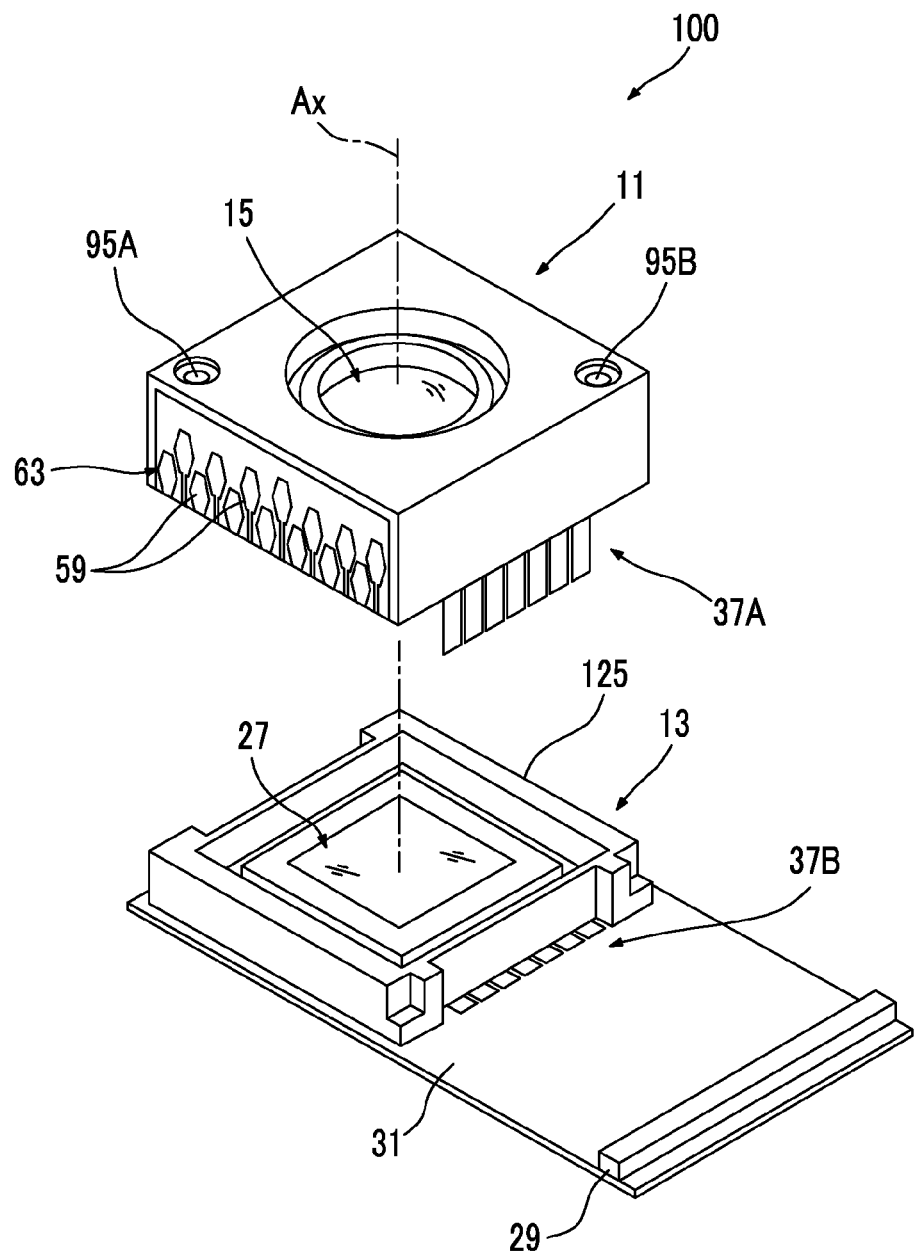
FIG. 2 is an exploded perspective view of the imaging module shown in FIG. 1.
Figure 3:
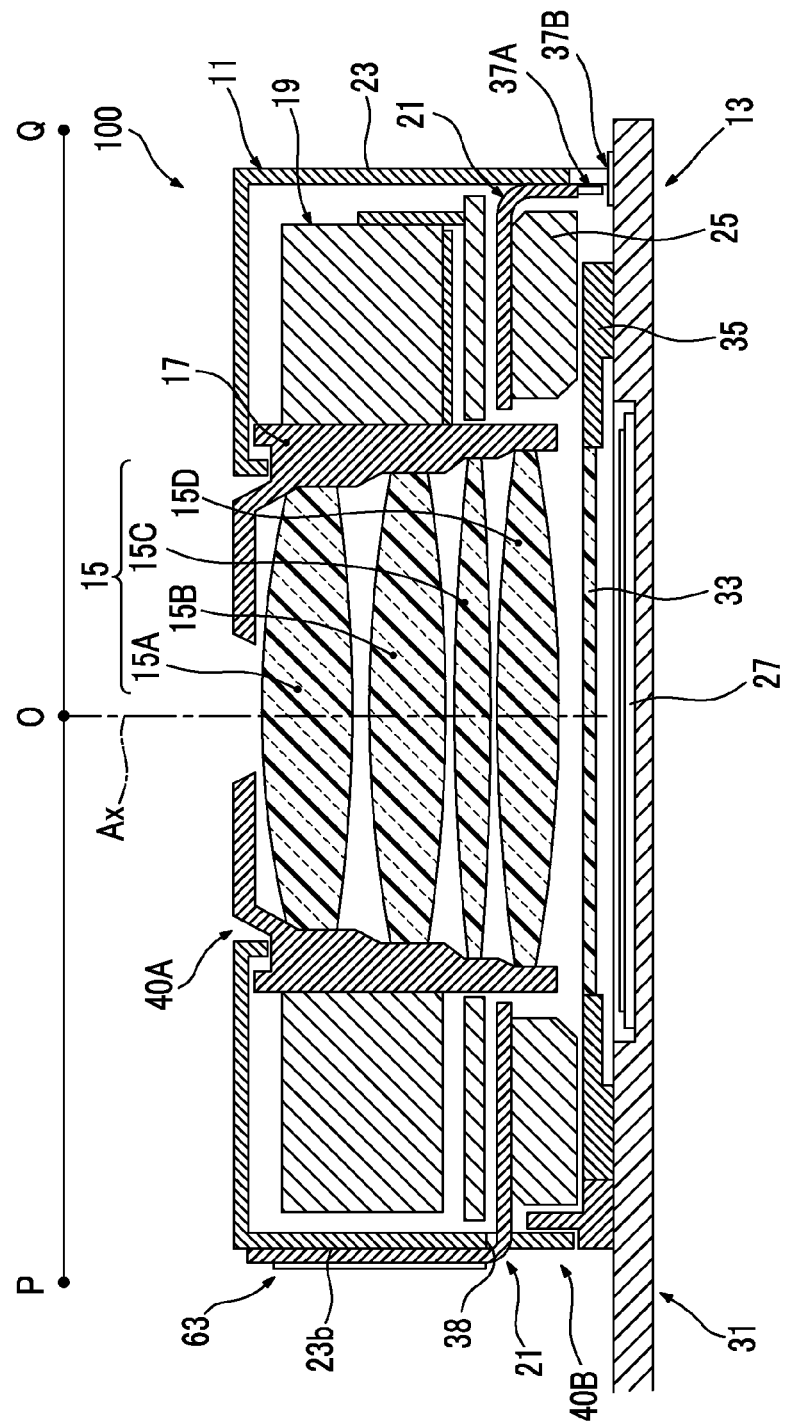
FIG. 3 is a cross-sectional view taken along line P-O-Q of FIG. 1.

FIG. 1 is a view showing an embodiment of the invention and is a perspective view of the appearance of an imaging module. FIG. 2 is an exploded perspective view of the imaging module shown in FIG. 1. FIG. 3 is a cross-sectional view taken along line P-O-Q of FIG. 1. In the following description of the respective drawings, the same repeated members are denoted by common reference numerals and the description of the members will be omitted or simplified.

As shown in FIGS. 1 and 2, an imaging module 100 includes a lens unit 11 and an imaging element unit 13 fixed to the lens unit 11. The lens unit 11 forms an observation image on an imaging element 27, which is included in the imaging element unit 13, by a lens group 15. The imaging element unit 13 outputs image signals of the observation image that is picked up through the lens group 15.

As shown FIG. 3, the lens unit 11 includes the lens group 15 (which is a lens group including lenses 15A, 15B, 15C, and 15D in an example shown in FIG. 3, but is not limited thereto), a lens barrel 17, a lens drive device 19, a flexible printed circuit (FPC) 21, a housing 23, and a bottom block 25. The lens barrel 17 supports the lens group 15 so that the lens group 15 is movable. The housing 23 houses the lens drive device 19 therein and covers the outside of the lens unit 11. The bottom block 25 is disposed on the bottom in the housing 23, and surrounds the outer peripheral portion of the lens barrel 17.

The imaging element unit 13 mainly includes the imaging element 27, an element fixing board 31 on which the imaging element 27 is mounted, a sheet of cover glass 33, and a cover holder 35. The element fixing board 31 includes an external connection portion that is electrically connected to an external device. The cover holder 35 holds the cover glass 33 and fixes the cover glass 33 to the element fixing board 31.

The imaging element 27 is an imaging element, such as a CCD image sensor or a CMOS image sensor, having a large number of pixels equal to or larger than 3 to 10 million; and a pixel pitch of the imaging element 27 is 1 μm or less. Here, the pixel pitch means the shortest distance among the distances between the centers of photoelectric conversion regions that are included in the pixels of the imaging element 27.

As shown in FIGS. 1 and 2, the element fixing board 31 is a rectangular board, and the imaging element 27 (see FIG. 2) is mounted on one of both end portions of the element fixing board 31 in a longitudinal direction of the element fixing board 31, and the external connection portion 29 is disposed at an end of the other thereof.

The element fixing board 31 includes a support portion, the external connection portion 29, and an element wiring portion (not shown) that are provided on one board. The support portion supports the imaging element 27, the external connection portion 29 is electrically connected to the outside of the imaging element unit 13, and the element wiring portion electrically and physically connects the support portion to the external connection portion 29.

The lens unit 11 and the imaging element unit 13 are separately formed. The positions and postures of the lens unit 11 and the imaging element unit 13 are adjusted using an image, which is picked up through the lens unit 11 by the imaging element 27, so that the image-formation plane of a subject to be imaged by the lens unit 11 corresponds to the imaging face of the imaging element 27 of the imaging element unit 13. When the lens unit 11 and the imaging element unit 13 are fixed to each other by adhesion after the positions and postures of the lens unit 11 and the imaging element unit 13 are adjusted, a product of an imaging module is completed.

The lens unit 11 and the imaging element unit 13 are provided with a unit connecting section 37A (a first connecting portion) and a unit connecting section 37B that are electrically connected to each other when the lens unit 11 and the imaging element unit 13 are fixed to each other, respectively. The unit connecting section 37A is formed of a plurality of comb-shape terminals, and the unit connecting section 37B is formed of a plurality of electrode pads that are disposed so as to correspond to the respective terminals of the unit connecting section 37A. The unit connecting sections 37A and 37B are electrically connected to each other by coming into contact with each other, being soldered to each other, or the like.

The lens drive device 19 includes a focus drive unit that adjusts the focus by moving the lens barrel 17, which supports the lens group 15, relative to the imaging element 27 along a lens axis Ax that is an optical axis of the lens group. Further, the lens drive device 19 includes two image blur-correction drive units, which perform image blur-correction driving, such as optical image stabilization, for moving the lens barrel 17 relative to the imaging element 27 in a direction perpendicular to the lens axis Ax or tilting the lens barrel 17 relative to the imaging element 27 from a plane orthogonal to the lens axis Ax; and drives the two image blur-correction drive units as necessary.

A drive mechanism of the lens drive device 19 for focus-adjustment driving and image blur-correction driving may be a mechanism that displaces a part of the plurality of lenses 15A to 15D of the lens group 15.

The flexible printed circuit 21 will be described in detail below. The flexible printed circuit 21 is a wiring board that is used to adjust the optical axis of the lens unit 11 and to be electrically connected to an external device including the imaging element unit 13, and is supported by the bottom block 25 provided in the housing 23. Since the flexible printed circuit 21 is used, it is possible to improve the degree of freedom in the routing of wires or the layout of the connection terminals.

The flexible printed circuit 21 includes lens driving wires (a first wiring portion) that include a plurality of wires for electrically connecting the unit connecting section 37A to the lens drive device 19. The lens driving wires are wires that are mainly used after the imaging module is formed as a product. Further, the flexible printed circuit 21 includes adjustment wires (a second wiring portion) that include a plurality of wires for electrically connecting adjustment terminals (second connecting portions) to be described below to the lens drive device 19. The adjustment wires are wires that are electrically connected to only a drive unit used to drive the lenses during adjustment, among the drive units connected to the lens driving wires of the lens drive device 19. The lens drive device 19 is connected to two kinds of wires, that is, the lens driving wires connected to the unit connecting section 37A and the adjustment wires, which adjust the lens unit 11 alone, through the flexible printed circuit 21.

A driving signal, which is required to perform focus driving or image blur-correction driving for optical image stabilization, is input to or output from the lens drive device 19 shown in FIG. 3 through the unit connecting section 37A. Further, when the unit connecting sections 37A and 37B are not electrically connected to each other, a driving signal for adjustment can be input to the lens drive device 19 through the adjustment wires from an adjustment terminal portion 63 or can be output from the lens drive device 19 through the adjustment wires. The driving signal includes driving power that drives the drive unit and a signal that is output from the sensor.

The adjustment terminal portion 63, which inputs/output the driving signal for adjustment to/from the lens drive device 19, is provided on a part of the flexible printed circuit 21 that extends from the housing 23 of the lens unit 11, and is disposed outside the housing 23. The adjustment terminal portion 63 includes a plurality of adjustment terminals 59 that are formed by exposing conductive portions of a part of the wires of the flexible printed circuit 21 to the outside. The plurality of adjustment terminals 59 are arranged on multiple rows at regular intervals. The adjustment terminals 59 of one row are disposed so as to be shifted from those of the adjacent row by a half of the pitch of the adjustment terminals 59, and the adjustment terminals 59 adjacent to each other in a direction of the row are alternately disposed. It is possible to dispose the adjustment terminals with high space efficiency by using the arrangement pattern of the adjustment terminals 59.

When the lens unit 11 and the imaging element unit 13 are fixed to each other, probe pins for adjustment driving, which will be described in detail below, come into contact with the plurality of adjustment terminals 59. Control signals for adjustment, which are required to perform at least one of the focus driving and the image blur-correction driving for optical image stabilization, are input to or output from the lens drive device 19 through the probe pins. Since this structure is a structure in which the probe pins can simply come into contact with the adjustment terminals 59, a connector does not need to be mounted or removed during adjustment. Accordingly, it is possible to shorten the tact time of manufacturing steps.

Since the adjustment terminal portion 63 is disposed on the flexible printed circuit 21, it is possible to ensure a large area of the terminals without reducing the area of each terminal even though the lens unit requires a plurality of adjustment terminals 59 to drive the lenses by multiaxis control. Accordingly, reliable probing can be performed. Meanwhile, the adjustment terminal portion 63 is coated with an insulating material after the lens unit 11 and the imaging element unit 13 are aligned with each other and fixed to each other. The insulating material may cover the conductive surfaces of at least the adjustment terminals 59. Accordingly, the short-circuit of the adjustment terminal portion 63 after the fixing and the input of noises to the lens drive device 19 are prevented.

Figure 4:
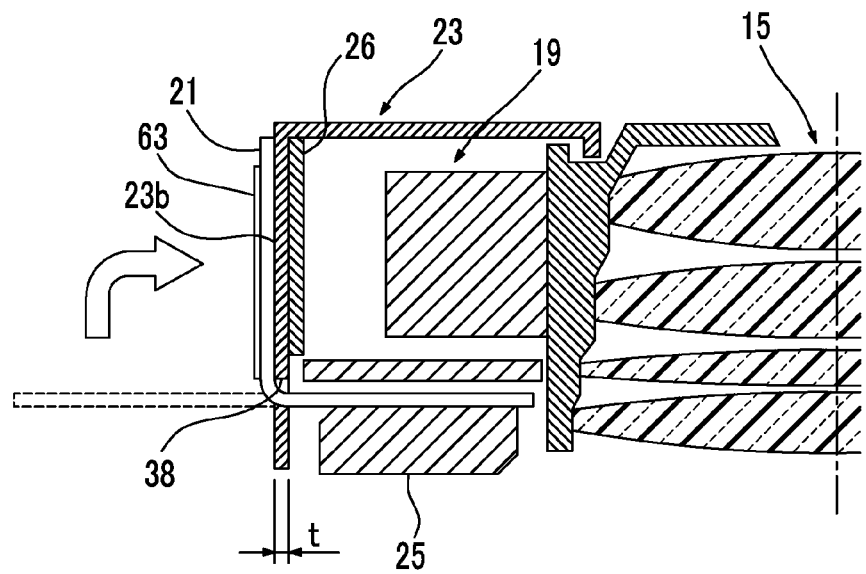
FIG. 4 is a partially enlarged cross-sectional view of a lens unit.

FIG. 4 is a partially enlarged cross-sectional view of the lens unit 11. The housing 23 of the lens unit 11 includes a side surface 23a (see FIG. 1) facing the external connection portion 29 of the element fixing board 31. Further, the housing 23 includes a side surface 23b adjacent to the side surface 23a. An opening portion 38 is formed at a wall including the side surface 23b. The flexible printed circuit 21, which extends from the opening portion 38, is bent at a right angle at the opening portion 38, and the surface of the flexible printed circuit 21 opposite to the surface of the flexible printed circuit 21 on which the adjustment terminal portion 63 is formed is fixed to the side surface 23b that is an outer surface of the housing 23. For example, the surface of the flexible printed circuit 21 opposite to the surface of the flexible printed circuit 21 on which the adjustment terminal portion 63 is formed is attached to the side surface 23b of the housing 23. By this structure, the extending flexible printed circuit 21 does not interfere with peripheral members and is not in the way.

It is preferable that a reinforcing member 26 is disposed on the inner surface of the wall of the housing 23 including the side surface 23b to which the adjustment terminal portion 63 is fixed. The reinforcing member 26 may be disposed on the back side of an exposed surface of the flexible printed circuit 21, to which the adjustment terminal portion 63 is exposed, so as to be integrated with the exposed surface of the flexible printed circuit 21. For example, the reinforcing member 26 may be interposed between the side surface 23b of the housing 23 and the flexible printed circuit 21. Since the reinforcing member 26 is provided, the deformation of the adjustment terminal portion 63 and the housing 23 can be suppressed when the adjustment terminal portion 63 and the housing 23 are pressed by probe pins that are to be electrically connected during adjustment.

Instead of the use of the reinforcing member 26, the thickness t of the wall including the side surface 23b to which the adjustment terminal portion 63 is fixed may be made larger than the thickness of a wall including a side surface to which the adjustment terminal portion 63 is not fixed. Further, when the thickness t of the wall including the side surface 23b on which the reinforcing member 26 is provided is made larger than the thickness of the wall including the other side surface on which the reinforcing member 26 is not provided, an effect of suppressing deformation is further improved.

In this structure, the adjustment terminal portion 63 is provided on a part of the flexible printed circuit 21 and a terminal pattern region of the flexible printed circuit 21 on which the adjustment terminal portion 63 is provided is fixed to the side surface of the housing that forms the outside of the housing 23. However, the invention is not limited to this structure. For example, the flexible printed circuit 21 and the adjustment terminal portion 63 may be separately formed, the adjustment terminal portion 63 may be fixed to the outside of the housing 23, and both the flexible printed circuit 21 and the adjustment terminal portion 63 may be connected to each other by wires. In this case, the degree of freedom in the disposition of the adjustment terminal portion 63 can be further improved.

As shown in FIG. 1, the unit connecting sections 37A and 37B are disposed along the side surface 23a, which faces the external connection portion 29, of the lens unit 11.

As shown in FIG. 3, the lens unit 11 and the imaging element unit 13, which have been fixed to each other by adhesion, include stepped portions 40A and 40B in which protrusions and recesses are combined with each other, and the like and form a sealing structure in which the lens group 15, the lens drive device 19, and the imaging element 27 are sealed in the housing 23.

The flexible printed circuit 21 closes the opening portion 38 of the housing 23 so that the lens group 15 is sealed in the housing 23. Accordingly, dust and the like are prevented from entering the unit.

Figure 5:
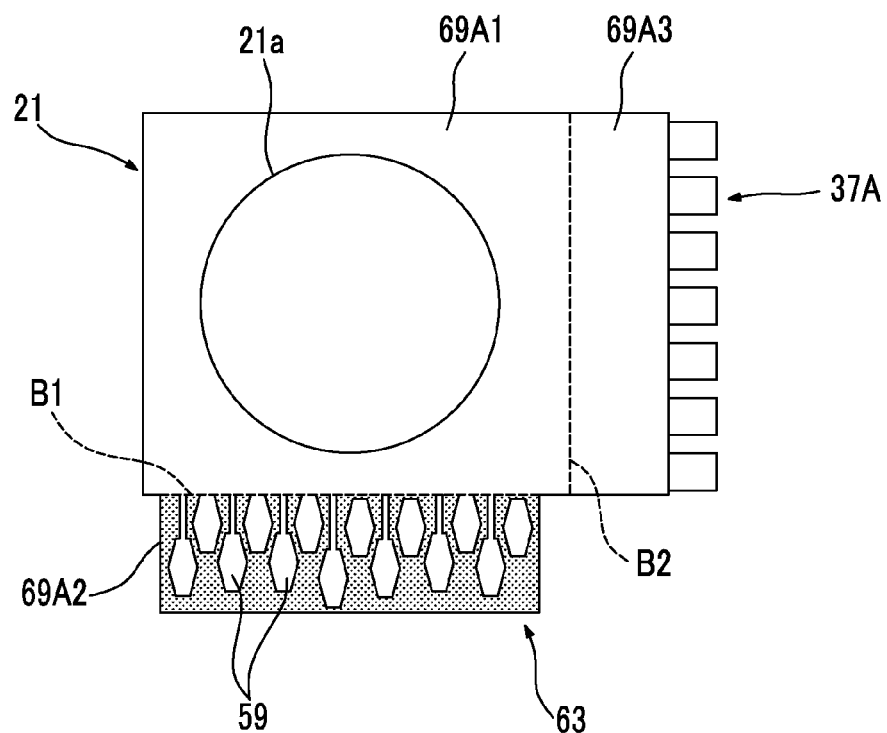
FIG. 5 is a plan view of a flexible printed circuit.

FIG. 5 is a plan view of the flexible printed circuit 21. The flexible printed circuit 21 includes a support region 69A1 that is supported by the bottom block 25 provided in the housing 23, a terminal pattern region 69A2 in which the adjustment terminal portion 63 is formed, and an external connection terminal region 69A3 in which the unit connecting section 37A is formed.

The flexible printed circuit 21 is bent at a right angle at a fold line B1 that is formed at a boundary between the support region 69A1 and the terminal pattern region 69A2. Further, the flexible printed circuit 21 is bent at a right angle at a fold line B2, which is formed at a boundary between the support region 69A1 and the external connection terminal region 69A3, to the side opposite to the side to which the flexible printed circuit 21 is bent at the fold line B1. The flexible printed circuit 21, which is bent at a right angle at the fold lines B1 and B2, is housed in the lens unit 11, and the adjustment terminal portion 63 and the unit connecting section 37A are disposed outside the housing 23. As shown in FIG. 1, the unit connecting section 37A is suspended and disposed so as to face the unit connecting section 37B provided on the element fixing board 31.

An opening portion 21a is formed at the flexible printed circuit 21. The opening portion 21a is a circular hole and is a hole into which the lens barrel 17 shown in FIG. 3 is inserted.

When the lens unit 11 and the imaging element unit 13 are fixed to each other, the probe pins, which will be described in detail below, come into contact with the respective adjustment terminals 59 of the adjustment terminal portion 63 of the flexible printed circuit 21. A driving signal, which is required to perform focus driving or image blur-correction driving for optical image stabilization, is input to the lens drive device 19 through the probe pins.

The lens drive device 19, which is shown in FIG. 3, of the imaging module 100 having the above-mentioned structure moves the lens barrel 17 along the lens axis Ax, so that a focusing operation is performed. Further, when the lens drive device 19 moves the lens barrel 17 relative to the imaging element 27 along two axes, which are present in a plane perpendicular to the lens axis Ax and are orthogonal to each other, or tilts the lens barrel 17 relative to the imaging element 27 from a plane orthogonal to the lens axis Ax, an image blur correcting operation, such as optical image stabilization, is performed.

Since the imaging module 100 having this structure can simultaneously perform both the focusing operation and the image blur correcting operation or can perform only one of the focusing operation and the image blur correcting operation, the imaging module 100 is adapted to be capable of performing each operation at an arbitrary time as necessary.

Furthermore, the imaging module 100 having this structure uses the imaging element 27 having a pixel pitch of 1 μm. Since the pixel size of an imaging element having a small pixel pitch is small, the light sensitivity of the imaging element having a small pixel pitch deteriorates. For this reason, the imaging element having a small pixel pitch needs to be combined with lenses having a small f-number. Since the depth of focus becomes shallow in this case, a phenomenon in which the resolving power is reduced only in one direction around a screen is likely to occur. Accordingly, high accuracy is required in the assembly of lenses. Particularly, when the pixel pitch of the imaging element is 1 μm or less, there are disadvantages in that it is difficult to adjust the lenses and the man-hours for the manufacturing steps are increased. However, since a large area of the terminals of the adjustment terminal portion 63 can be ensured in the imaging module 100 having this structure, stable probing can be realized. Accordingly, the lens unit 11 and the imaging element unit 13 can be aligned with each other with high accuracy.

Next, the details of the lens drive device 19 of the lens unit 11 and the wires for driving the lens drive device 19 will be described in detail.

Figure 6:
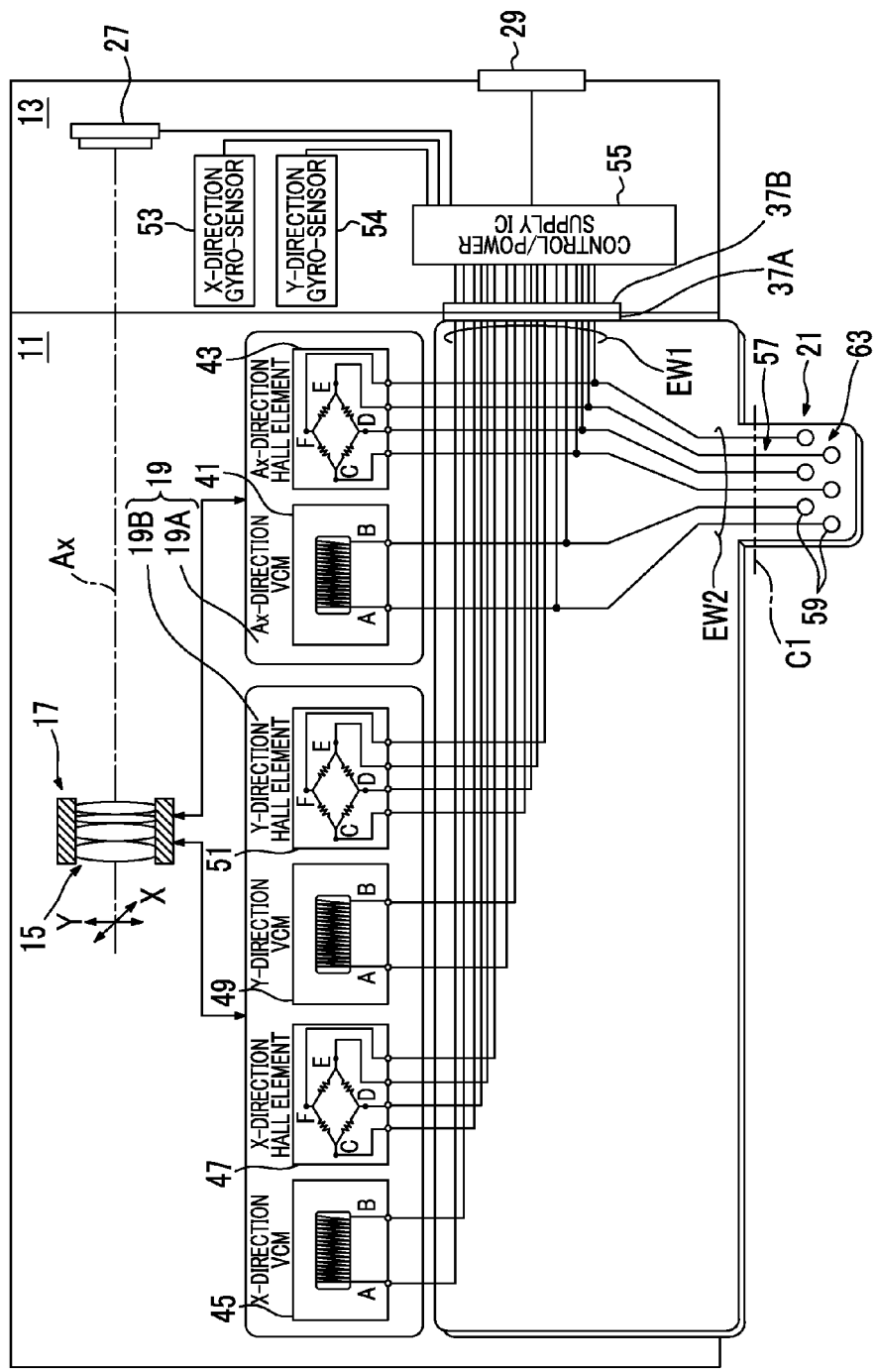
FIG. 6 is a schematic wiring diagram of the lens unit and an imaging element unit.

FIG. 6 is a schematic wiring diagram of the lens unit 11 and the imaging element unit 13. The aspect of wires shown in FIG. 6 is exemplary, and the wires are not limited thereto. The lens drive device 19 includes a focus drive device 19A that performs focus adjustment and an image blur correction-drive device 19B that performs image blur correction. Each of the focus drive device 19A and the image blur correction-drive device 19B uses a voice coil motor (VCM) as a drive unit for driving a lens, and uses a hall element as a sensor for detecting the position of a lens. Meanwhile, the VCM and the hall element are exemplary, and the drive unit for driving a lens and the sensor for detecting the position of a lens may be other devices without being limited thereto.

The focus drive device 19A includes an Ax-direction VCM 41 that is a focus drive unit for driving the lens barrel 17 along the lens axis Ax, and an Ax-direction hall element 43 that detects the position of the lens in an Ax direction.

The image blur correction-drive device 19B drives the lens barrel 17 in an X direction (first direction) and a Y direction (second direction) that are orthogonal to each other in a plane perpendicular to the lens axis Ax. The image blur correction-drive device 19B includes an X-direction VCM 45 and an X-direction hall element 47. The X-direction VCM 45 is a first image blur-correction drive unit for driving the lens barrel 17 in the X direction that is a horizontal direction perpendicular to the lens axis Ax, and the X-direction hall element 47 detects the position of the lens in the X direction. The image blur correction-drive device 19B further includes a Y-direction VCM 49 and a Y-direction hall element 51. The Y-direction VCM 49 is a second image blur-correction drive unit for driving the lens barrel 17 in the Y direction that is perpendicular to the lens axis Ax and the X direction, and the Y-direction hall element 51 detects the position of the lens in the Y direction. Meanwhile, the image blur correction-drive device 19B may be a drive mechanism that tilts the lenses. Since a well-known drive mechanism can be used as the drive mechanism in this case, the description thereof will be omitted.

The lens unit 11 includes a first wiring portion EW1 that corresponds to the above-mentioned lens driving wires for electrically connecting the lens drive device 19 to the unit connecting section 37A provided on the lens unit 11, and a second wiring portion EW2 that corresponds to the above-mentioned adjustment wires electrically connected to the lens drive device 19. The first wiring portion EW1 and the second wiring portion EW2 are formed on the flexible printed circuit 21.

A wiring pattern of the flexible printed circuit 21 is formed so that a first wiring portion EW1 mainly connects wires of the lens drive device 19 to the unit connecting section 37A and a second wiring portion EW2 mainly connects the wires of the lens drive device 19 to the respective adjustment terminals 59 of the adjustment terminal portion 63.

The first wiring portion EW1 includes a plurality of wires that are electrically connected to the drive units (the Ax-direction VCM 41, the X-direction VCM 45, and the Y-direction VCM 49) and the sensors (the Ax-direction hall element 43, the X-direction hall element 47, and the Y-direction hall element 51).

The second wiring portion EW2 includes wires that are electrically connected to the drive units (or the drive units and the sensors corresponding to the drive units), which correspond to the driving directions in which the lens barrel needs to be driven during adjustment, among the drive units (the Ax-direction VCM 41, the X-direction VCM 45, and the Y-direction VCM 49) and the sensors (the Ax-direction hall element 43, the X-direction hall element 47, and the Y-direction hall element 51) connected to the first wiring portion EW1. That is, the second wiring portion EW2 is not connected to all of the drive units (or all of the drive units and all of the sensors corresponding to the drive units), and is connected to only some of the drive units (or some of the drive units and the sensors corresponding to some of the drive units).

Accordingly, the second wiring portion EW2 is electrically connected to some of the drive units, wires that are connected to the sensors corresponding to some of the drive units, and wires that are connected to the unit connecting section 37A.

In an example shown in FIG. 6, wires connected to the focus drive unit (the Ax-direction VCM 41) and the focus adjustment sensor (the Ax-direction hall element 43) form the second wiring portion EW2.

Since the wires of the second wiring portion EW2 are connected to some of the wires of the first wiring portion EW1, the driving of the drive unit, which is driven during adjustment, through the first wiring portion EW1 and the acquisition of a detection signal from the sensor through the first wiring portion EW1 can be performed in the same manner through the second wiring portion EW2.

Meanwhile, each of the drive units is provided with two contacts (contacts A and B connected to coils) and each of the sensors is provided with four contacts (contacts C, D, E, and F connected to a bridge circuit) in the above-mentioned structure, but the number of the contacts is exemplary and varies according to the type of the drive unit or the sensor. Further, since the number of contacts or wires to be required is increased regardless of the type of the drive unit or the sensor when the lens group 15 is subjected to multiaxis control, a particularly large area in which the adjustment terminals 59 are disposed is required.

The imaging element unit 13 includes the imaging element 27, an X-direction gyro sensor 53 that detects an angular velocity in the X direction, a Y-direction gyro sensor 54 that detects an angular velocity in the Y direction, and a control/power supply IC (Integrated Circuit) 55. After the manufacture of the imaging module, the control/power supply IC 55 drives the image blur correction-drive device 19B according to the angular velocities in the respective directions that are detected by the X-direction gyro sensor 53 and the Y-direction gyro sensor 54. Furthermore, the control/power supply IC 55 controls the imaging element 27 so that the imaging element 27 outputs an imaging signal, and controls the supply of power to the entire system.

The first wiring portion EW1 of the lens unit 11 is connected to the control/power supply IC 55 through the unit connecting sections 37A and 37B. The imaging element 27, the X-direction gyro sensor 53, and the Y-direction gyro sensor 54 are connected to the control/power supply IC 55, and the control/power supply IC 55 is connected to the external connection portion 29.

In the second wiring portion EW2 having this structure, wires, which are connected to drive units corresponding to driving directions in which the lens barrel 17 does not need to be driven during adjustment and sensors corresponding to these drive units, are omitted and wires, which are connected to the Ax-direction VCM 41 and the Ax-direction hall element 43 of the focus drive device 19A corresponding to a driving direction in which the lens barrel 17 needs to be driven during adjustment, that is, the Ax direction, are included. The second wiring portion EW2 may include wires that are connected to drive units and sensors corresponding to driving directions in which the lens barrel needs to be driven other than the Ax direction.

That is, when only focus adjustment is performed, the second wiring portion EW2 includes only wires connected to the Ax-direction VCM 41 and the Ax-direction hall element 43. When focus adjustment and X-direction image blur correction are performed, the second wiring portion EW2 further includes wires that are connected to the X-direction VCM 45 and the X-direction hall element 47.

When the wires of the second wiring portion EW2 are formed of only wires connected to the drive units and the sensors corresponding to directions in which the lens barrel needs to be driven during adjustment, the number of wires of the second wiring portion EW2 and the number of the adjustment terminals 59 connected to the respective wires can be minimized. Accordingly, the degree of freedom in the disposition of the adjustment terminals 59 can be improved, and the area of each of the plurality of adjustment terminals 59 disposed on the side surface 23b of the housing 23 can be increased. Since the probe pin can come into contact with the adjustment terminal 59 having a large area during adjustment by this structure, reliable probing can be performed.

Figure 7A:
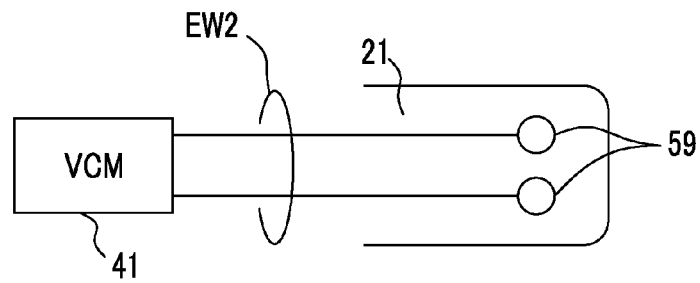
FIGS. 7A to 7C are views showing examples of the configuration of a second wiring portion.
Figure 7B:
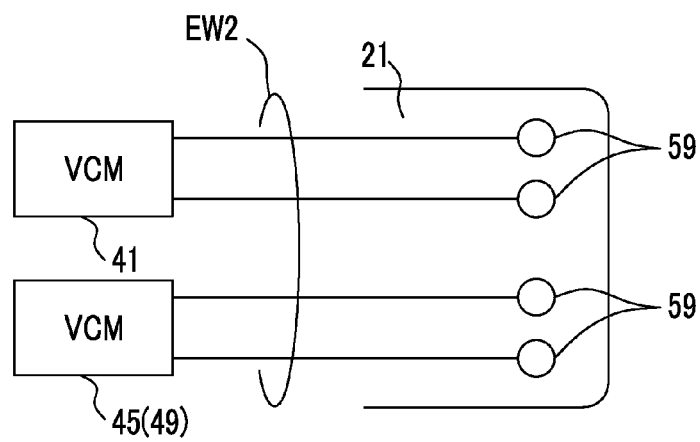
Figure 7C:
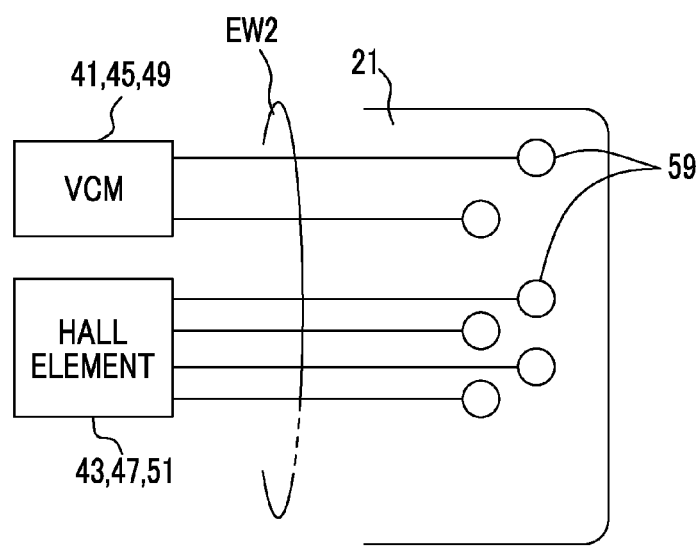

That is, the second wiring portion EW2 employs various forms according to directions in which the lens drive device 19 drives the lens barrel 17 or driving accuracy. FIGS. 7A to 7C show examples of the configuration of the second wiring portion. FIG. 7A shows a case in which the second wiring portion EW2 includes only wires connected to the Ax-direction VCM 41. In this case, since the adjustment terminals 59 can be increased in size through the simplification of wiring, probing is reliably performed.

FIG. 7B shows a case in which the second wiring portion EW2 includes only wires connected to the Ax-direction VCM 41 and the X-direction VCM 45 (or the Y-direction VCM 49). In this case, the lens barrel 17 can be driven in the Ax direction and the X direction by the lens drive device 19. That is, focus-adjustment driving and image blur-correction driving are performed.

FIG. 7C shows a case in which the second wiring portion EW2 includes wires, which are connected to the Ax-direction VCM 41 (or any one of the X-direction VCM 45 and the Y-direction VCM 49) and the Ax-direction hall element 43 (or any one of the X-direction hall element 47 and the Y-direction hall element 51), as a pair. In this case, since the driving of the VCM is subjected to feedback control by the hall element, the lenses are more accurately driven.

A driving signal, which is required for adjustment, between a driving signal, which drives the focus drive device 19A, and a driving signal, which drives the image blur correction-drive device 19B, is input to the above-mentioned lens unit 11 from the adjustment terminal portion 63 of the flexible printed circuit 21. For this reason, the lens unit 11 can drive the lens drive device 19 of the lens unit 11 through the adjustment terminal portion 63 even in an adjustment state in which the unit connecting section 37A is not electrically connected to the unit connecting section 37B.

A position where the adjustment terminal portion 63 is disposed is not limited to the side surface 23b of the housing 23, and can be appropriately changed according to the disposition of a probe unit. For example, the adjustment terminal portion 63 may be fixed to the side surface 23a.

When the lens unit 11 and the imaging element unit 13 are aligned with each other by using the above-mentioned second wiring portion EW2, the lens drive device 19 is driven according to the driving signal that is input from the adjustment terminal portion 63. Further, imaging is performed by the imaging element unit 13 while the lens drive device 19 is driven. An optical image-formation plane formed by the lens unit 11 is calculated on the basis of the obtained image, and the lens unit 11 and the imaging element unit 13 are aligned with each other so that the imaging face of the imaging element 27 corresponds to the optical image-formation plane of a subject image picked up by the lens unit 11.

Then, while the lens unit 11 and the imaging element unit 13 are aligned with each other as shown in FIG. 2, the lens unit 11 and the imaging element unit 13 are fixed to each other by an adhesive. Accordingly, the imaging module 100 shown in FIG. 1 is completed. A series of steps are performed by an imaging module-manufacturing apparatus to be described below.

Next, the details of the adjustment terminal portion 63 will be described.

Figure 8:
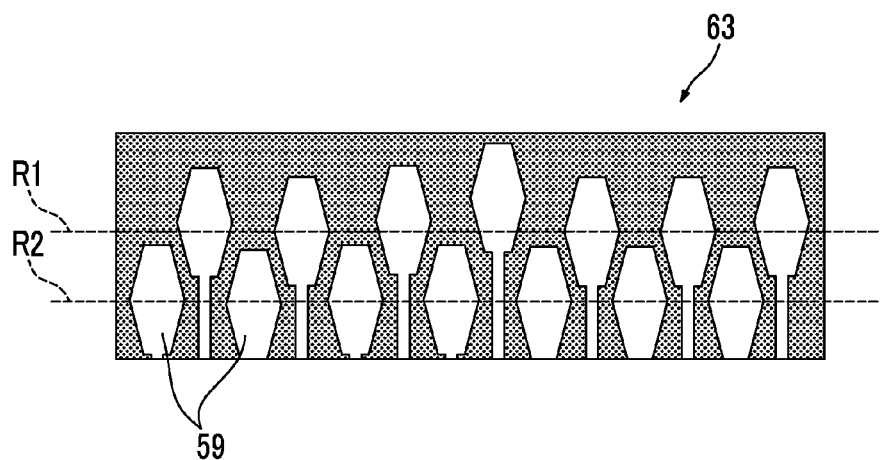
FIG. 8 is a plan view of an adjustment terminal portion.

FIG. 8 is a plan view of the adjustment terminal portion 63. The flexible printed circuit 21 includes the terminal pattern region in which the adjustment terminal portion 63 is formed. The terminal pattern region of the flexible printed circuit 21 is attached to the side surface 23b, which is one of the outer surfaces of the housing 23, by an adhesive. The plurality of adjustment terminals 59, which are arranged on the adjustment terminal portion 63, are arranged in multiple rows in a direction of a long side of the side surface 23b. In an example shown in FIG. 8, the respective adjustment terminals 59 are arranged in two rows, that is, a row R1 and a row R2. The respective adjustment terminals 59 are arranged in an arrangement pattern in which the column positions of the adjustment terminals 59 of the row R1 are shifted from those of the row R2 by a half of the pitch so that the respective adjustment terminals 59 do not overlap each other on the same column. The respective adjustment terminals 59 do not need to be arranged so as to exactly correspond to the straight lines of the row R1 and the row R2.

Since the adjustment terminals 59 need to be disposed not to overlap the wiring pattern when the adjustment terminals 59 are actually disposed, there is a problem in that a space in which the adjustment terminals 59 are disposed is insufficient. For this reason, the adjustment terminal 59 is not limited to a rectangular shape, such as a square shape, and may be a polygonal terminal with high space efficiency as in the example shown in FIG. 8. The respective adjustment terminals 59 may have sizes different from each other.

Figure 9:
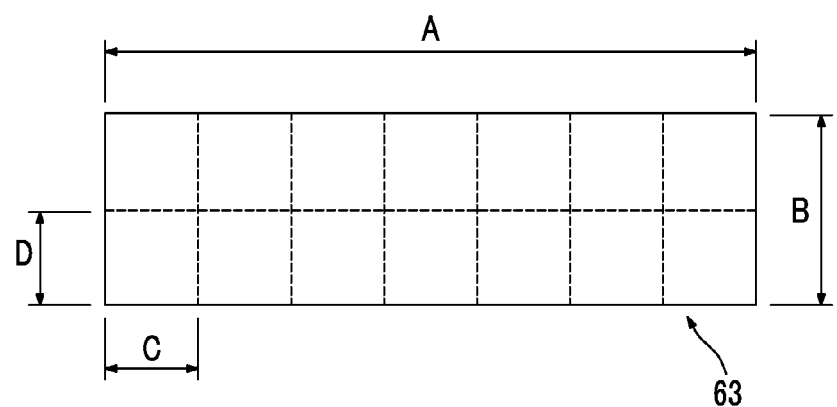
FIG. 9 is a view defining preferred array dimensions of adjustment terminals.

FIG. 9 is a view defining preferred array dimensions of the adjustment terminals. It is preferable that the respective adjustment terminals of the adjustment terminal portion 63 are disposed so that a difference between C and D is minimum when "C=A/(N/M)" and "D=B/M" are satisfied. Here, A, B, C, D, N, and M are the following parameters.

A: the length (mm) of a long side of the surface on which the adjustment terminals 59 are disposed (the entire surface of the adjustment terminal portion 63)

B: the length (mm) of a short side of the surface on which the adjustment terminals 59 are disposed (the entire surface of the adjustment terminal portion 63)

C: the length (mm) of one side (lateral side) of a rectangular region in which one adjustment terminal 59 is disposed D: the length (mm) of a side (longitudinal side), which is connected to the side of C, of a rectangular region in which one adjustment terminal 59 is disposed N: the number of the adjustment terminals 59

M: the number of the rows of the adjustment terminals 59

Meanwhile, in FIG. 9, N is 14 and M is 2 on the basis of the above definitions.

C/D is preferably in the range of 0.4 to 2.8, and more preferably in the range of 0.6 to 2. When C/D is set in the above-mentioned range, the adjustment terminals 59 can be disposed with high space efficiency. Accordingly, the respective adjustment terminals 59 can be formed so as to have an aspect ratio that allows the adjustment terminals to be easily electrically connected to the probe pins to be electrically connected during adjustment.

Next, modifications of the adjustment terminal portion 63 will be described.

<First Modification>

Figure 10:
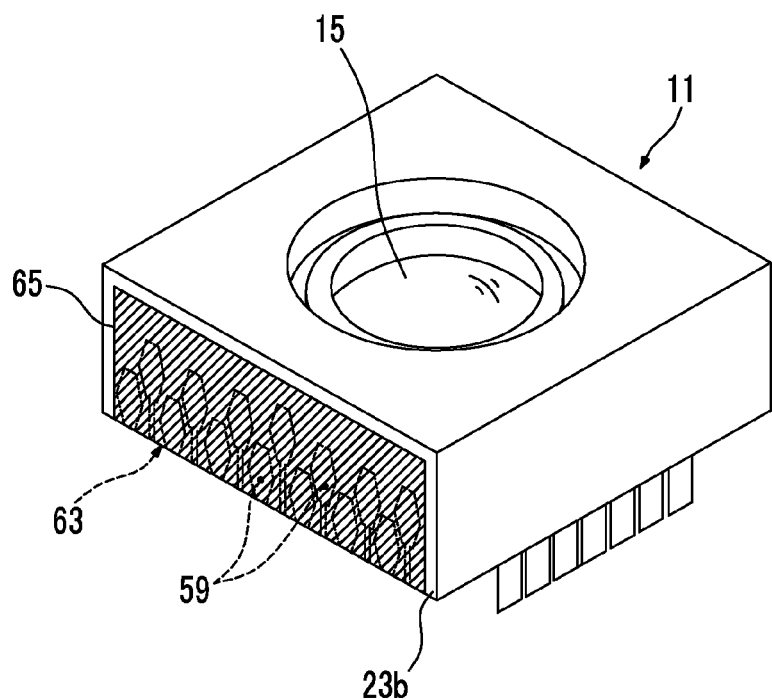
FIG. 10 is a perspective view of the lens unit of which the adjustment terminals are coated with an insulating material.

FIG. 10 is a perspective view of the lens unit of which the adjustment terminals are coated with an insulating material. After the lens unit and the imaging element unit are fixed to each other, the surface of each of the adjustment terminals 59 of the adjustment terminal portion 63 is coated with an insulating material 65. Accordingly, short-circuit of the wire of each adjustment terminal 59 is prevented by the coating using the insulating material 65. As a result, a malfunction of the imaging module can be prevented and the handling ability is also improved.

For example, a resin material, such as an acrylic resin, a urethane resin, or a fluorine resin, can be used as the insulating material 65. It is possible to simply insulate each of the adjustment terminals 59, which are fixed to the side surface 23b of the housing 23, by an application, a spray, or the like using the above-mentioned material.

<Second Modification>

Figure 11:
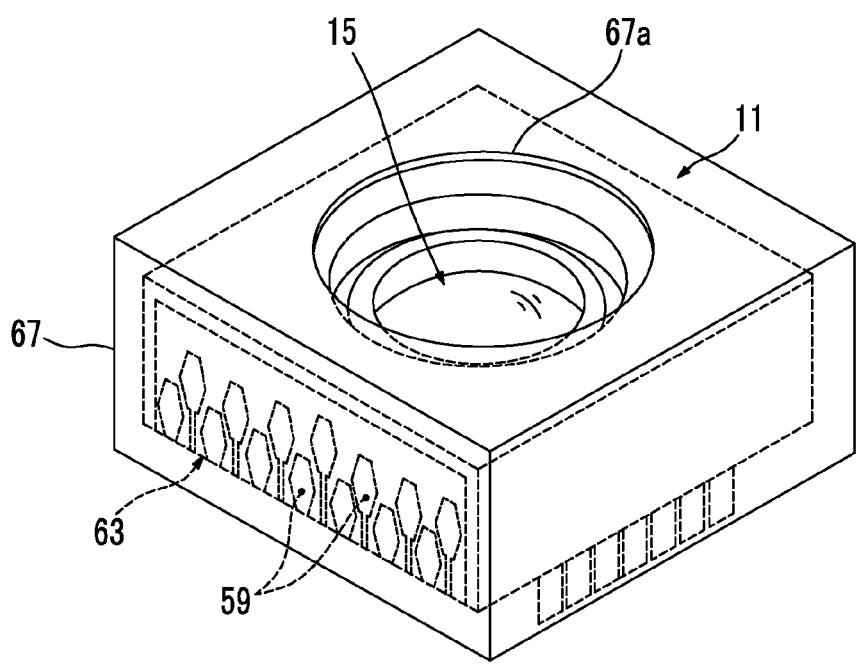
FIG. 11 is a perspective view of the lens unit of which the outside of the adjustment terminal portion is covered with a cover member.

FIG. 11 is a perspective view of the lens unit of which the outside of the adjustment terminal portion 63 is covered with a cover member 67. The cover member 67 has electrical insulating properties and covers the outside of the lens unit 11, and an opening portion 67a is formed at a portion of the cover member 67 that faces the lens group 15 of the lens unit 11.

According to this structure, since it is possible to reliably insulate the adjustment terminal portion 63 by a simple step of covering the outside of the lens unit 11 with the cover member 67, manufacturing steps are not complicated.

The cover member 67 may cover both the lens unit 11 and the imaging element unit 13. Alternatively, the cover member 67 may be an insulating member that covers at least the adjustment terminal portion 63. Plastic having insulating properties, rubber, and the like can be used as the material of the cover member 67. When the cover member 67 is made of, for example, a flexible rubber material, a cushioning property is obtained from the cover member 67. For this reason, since it is possible to protect the imaging module 100 from an external force, it is possible to improve the impact resistance of the imaging module 100.

<Third Modification>

Figure 12:
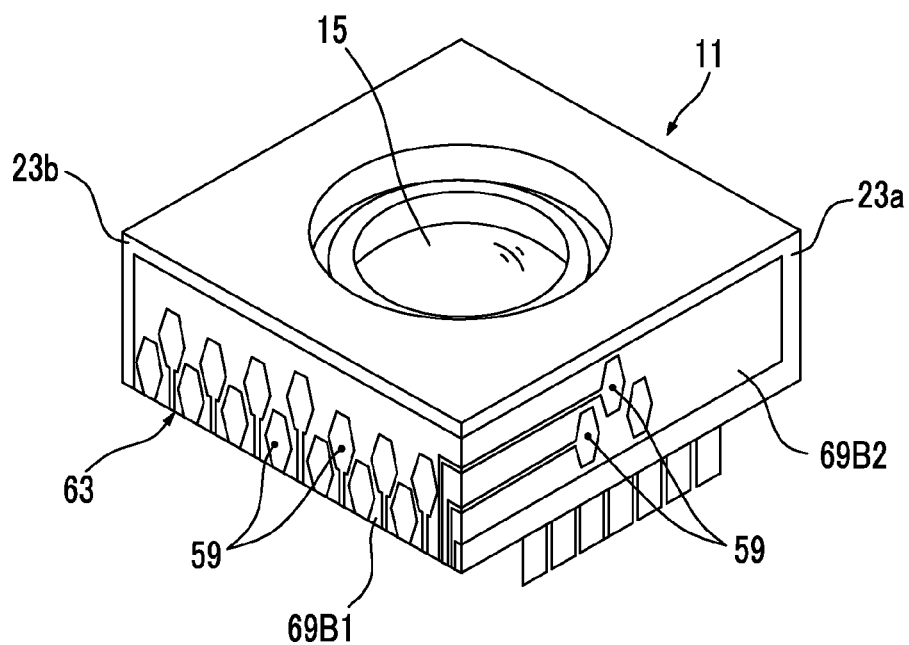
FIG. 12 is a perspective view of the lens unit showing an aspect in which a plurality of terminal pattern regions are fixed to a plurality of side surfaces of a housing.

FIG. 12 is a perspective view of the lens unit showing an aspect in which a plurality of terminal pattern regions are fixed to a plurality of side surfaces of a housing. The flexible printed circuit 21 having this structure includes a plurality of divided terminal pattern regions in which the adjustment terminals 59 are disposed. In an example shown in FIG. 12, two terminal pattern regions 69B 1 and 69B2 are disposed so that end portions of the terminal pattern regions 69B 1 and 69B2 are connected to each other, and the terminal pattern regions 69B1 and 69B2 are attached to different side surfaces 23a and 23b of the housing 23 of the lens unit 11, respectively. Since the adjustment terminal portion 63 is provided over the plurality of side surfaces of the housing 23, it is possible to ensure a large area in which the adjustment terminal portion 63 is disposed and to increase the number of terminals that can be installed. Further, the adjustment terminals 59 can also be disposed on a part of the upper and lower surfaces of the housing 23 other than the side surfaces 23a and 23b of the housing 23.

<Modification of Connection Form Between Lens Drive Device and Unit Connecting Section>

Next, a modification of a connection form of the flexible printed circuit 21, which includes the adjustment terminal portion 63, between the lens drive device 19 and the unit connecting section 37A will be described.

Figure 13:
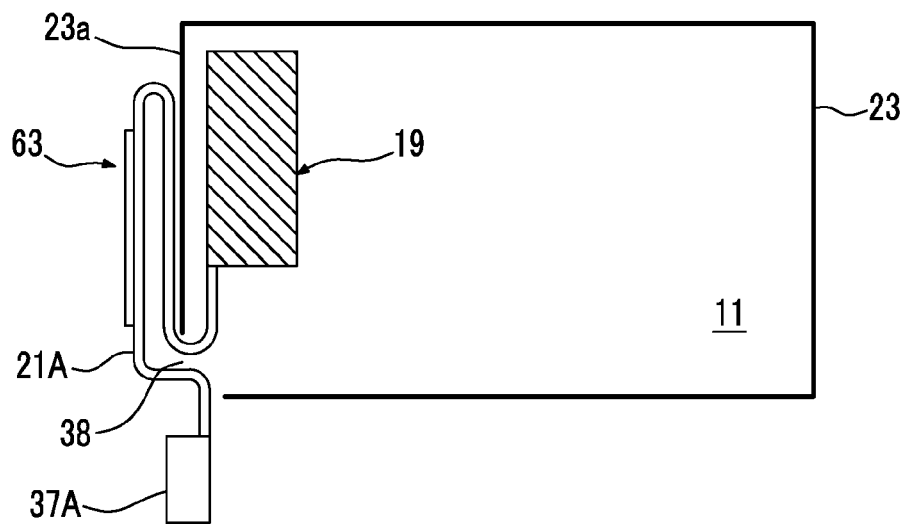
FIG. 13 is a schematic view showing a connection form of a flexible printed circuit.

FIG. 13 is a schematic view showing a connection form of a flexible printed circuit. A flexible printed circuit 21A includes at least a part of lens driving wires that electrically connect the lens drive device 19 to the unit connecting section 37A. One of both long end portions of the flexible printed circuit 21A is connected to the lens drive device 19. Further, the other end portion of the flexible printed circuit 21A extends to the outside of the housing from the opening portion 38 that is formed at the housing 23 of the lens unit 11. The unit connecting section 37A is provided at the other end portion of the flexible printed circuit.

A portion of the flexible printed circuit 21A, which extends from the opening portion 38, is laid along the lens axis on the side surface 23a of the housing 23; is folded back at a position close to the end portion of the side surface 23a; and is laid toward the opening portion 38 again. Further, an end of the flexible printed circuit 21A is suspended toward the unit connecting section 37A from the bottom of the lens unit 11. Furthermore, an adjustment terminal portion 63 is disposed on the outside of a region of the flexible printed circuit 21A that is laid on the side surface of the housing 23 of the lens unit 11 while overlapping.

In this case, adjustment wires, which electrically connect the lens drive device 19 to the adjustment terminal portion 63, of the flexible printed circuit 21A are also used as at least a part of the lens driving wires that electrically connect the lens drive device 19 to the unit connecting section 37A. For this reason, the lens drive device 19, the adjustment terminal portion 63, and the unit connecting section 37A can be connected to one another by one flexible printed circuit 21A. Accordingly, the configuration of wiring can be simplified.

Figure 14:
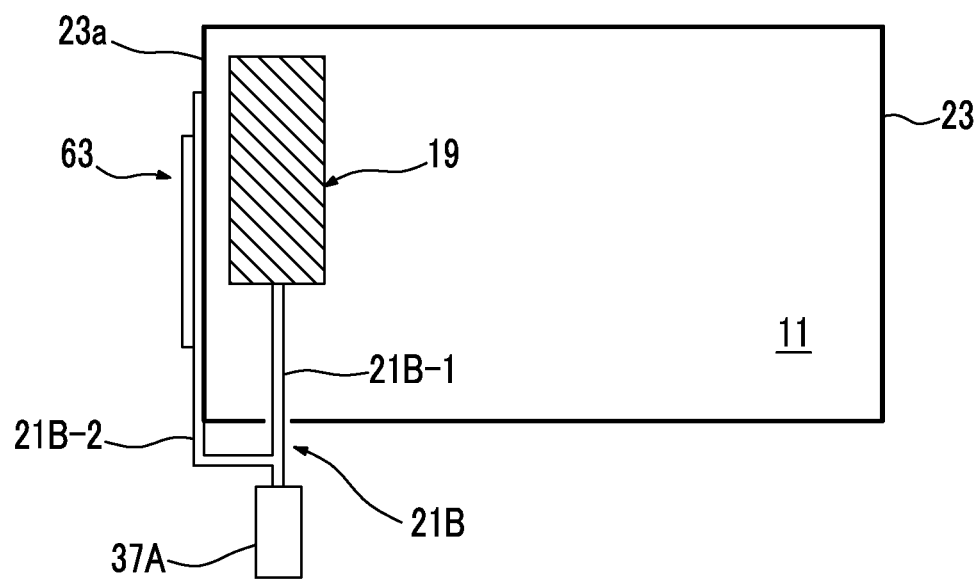
FIG. 14 is a schematic view showing another connection form of a flexible printed circuit.

FIG. 14 is a schematic view showing another connection form of a flexible printed circuit. A flexible printed circuit 21B includes a flexible printed circuit 21B-1 that includes lens driving wires connecting the lens drive device 19 to the unit connecting section 37A, and a flexible printed circuit 21B-2 that is branched from the lens driving wires of the flexible printed circuit 21B-1 and is fixed to the side surface 23a of the housing 23 of the lens unit 11.

The flexible printed circuit 21B-2 includes a region fixed to the side surface 23a of the housing 23, and an adjustment terminal portion 63 is disposed in this region.

In this case, adjustment wires, which are connected to the adjustment terminal portion 63, of the flexible printed circuit 21B are adapted to include a portion that is branched from the lens driving wires connected to the lens drive device 19. Accordingly, the degree of freedom in the layout of each wire is improved.

<Method of Manufacturing Imaging Module>

Next, a method of manufacturing the imaging module 100 will be described.

Figure 15:
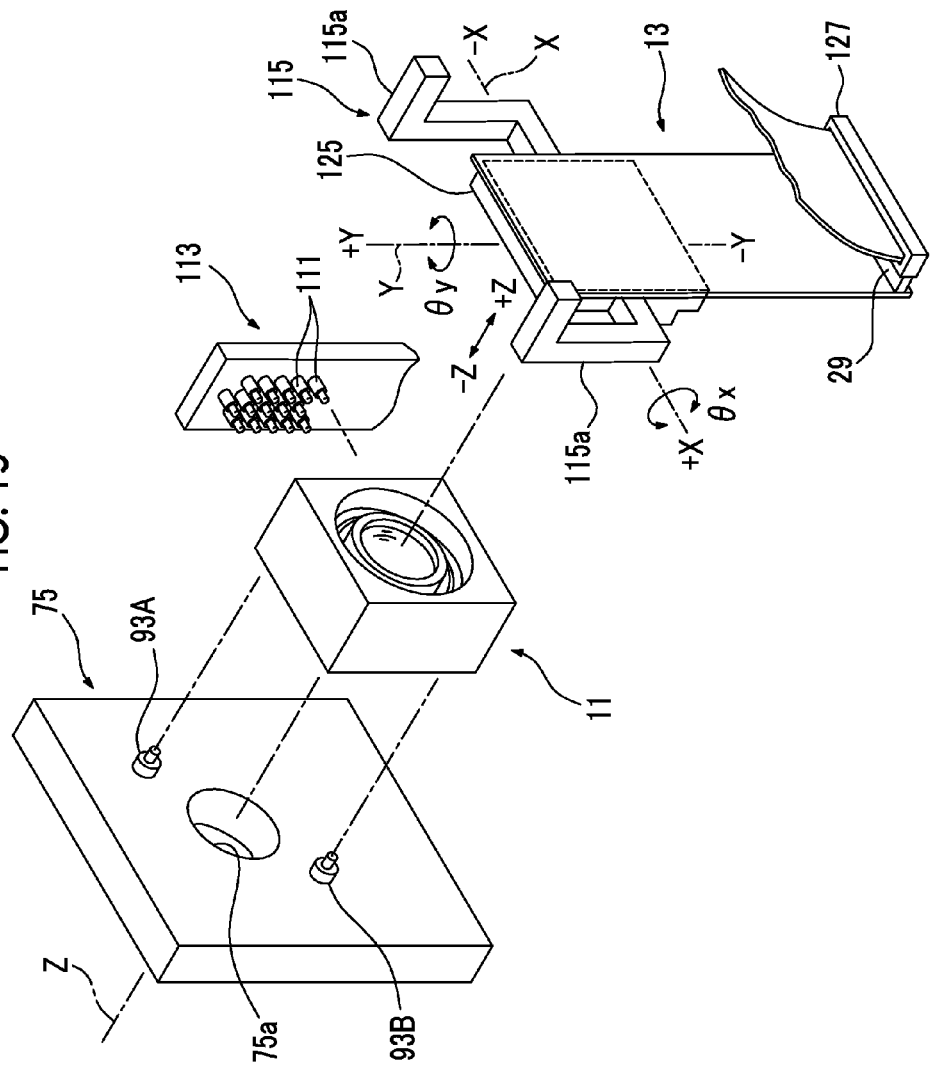
FIG. 15 is a schematic view showing a part of the structure of an imaging module-manufacturing apparatus.

FIG. 15 is a schematic view showing a part of the structure of an imaging module-manufacturing apparatus. When the imaging element unit 13, of which the position and the posture have been adjusted, is fixed to the lens unit 11 after the position and the posture of the imaging element unit 13 relative to the lens unit 11 are adjusted, the imaging module is obtained.

The lens unit 11 is held while being positioned on a lens positioning plate 75, and the imaging element unit 13 is held by a chuck hand 115 so that the posture of the imaging element unit 13 can be freely changed. Then, a probe unit 113 is disposed so as to face the side surface of the lens unit 11 on which the adjustment terminal portion 63 is disposed. The probe unit 113 is electrically connected to the above-mentioned lens drive device 19 (see FIG. 3) by allowing probe pins 111 to come into contact with the adjustment terminal portion 63 of the lens unit 11.

Fixing pins 93A and 93B are provided on the lens positioning plate 75 around an opening 75a. The fixing pins 93A and 93B position the lens unit 11 by being inserted into positioning holes 95A and 95B of the lens unit 11 shown in FIG. 1.

The chuck hand 115 includes a pair of pinching members 115a that pinch an outer frame 125 of the imaging element unit 13 and are bent substantially in the shape of a crank. These pinching members 115a are connected to actuators (not shown) that adjust the movement of the imaging element unit 13 in a Z-axis direction, the movement of the imaging element unit 13 in two axis directions (an X-axis direction and a Y-axis direction) orthogonal to a Z axis, and the tilts θx and θ$_y$ of the imaging element unit 13 about an X axis and a Y axis, respectively.

Each part is driven and controlled on the basis of commands from a control unit of the imaging module-manufacturing apparatus.

Figure 16:
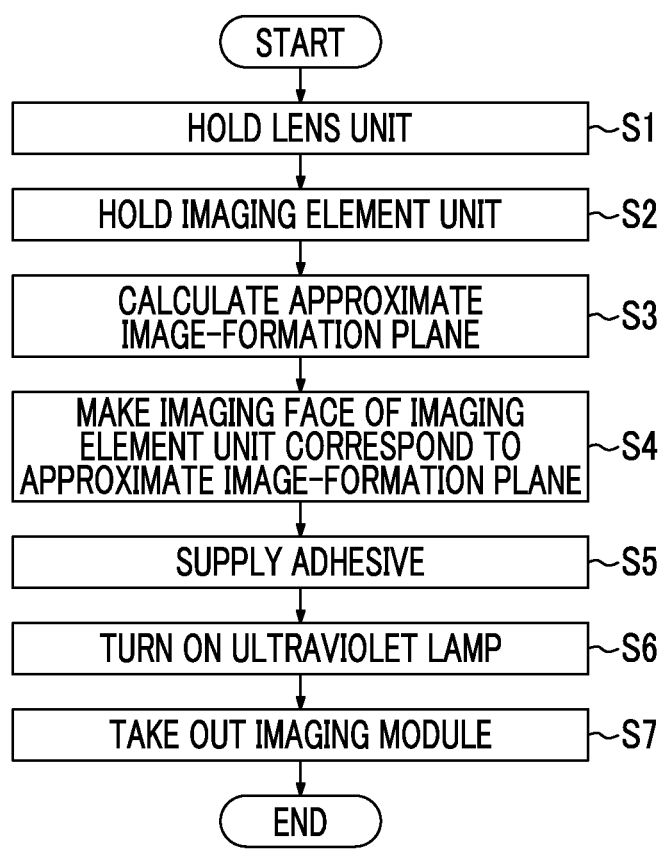
FIG. 16 is a flowchart illustrating steps of manufacturing the imaging module by the imaging module-manufacturing apparatus.

Next, steps of manufacturing the imaging module will be briefly described with reference to a flowchart of FIG. 16.

First, the fixing pins 93A and 93B of the lens positioning plate 75 are inserted into the positioning holes 95A and 95B of the lens unit 11 and the lens unit 11 is held at a prescribed position on the lens positioning plate 75 (S1). In this case, the probe unit 113 allows the probe pins 111 to come into contact with the adjustment terminal portion 63 of the lens unit 11.

Then, the outer frame 125 of the imaging element unit 13 is pinched by the pinching members 115a of the chuck hand 115, so that the imaging element unit 13 is held (S2).

After the lens unit 11 and the imaging element unit 13 are completely held, the control unit calculates an approximate image-formation plane on which a focus point of the lens unit 11 is approximately obtained (S3). The approximate image-formation plane is a plane that is obtained by representing focusing positions of the lens unit 11 as one plane in a three-dimensional coordinate system.

The approximate image-formation plane is approximately obtained in the following manner. First, the lens unit 11 is moved to a plurality of imaging positions that are arranged along a direction of an optical axis (the Z-axis direction), and picks up an image of a measurement chart at each of the imaging positions. An imaging position (Z coordinate) where a focusing degree is highest is obtained at each of a plurality of positions in the screens of the picked-up images (positions in an X-Y plane) on the basis of the picked-up images that are obtained in this way and correspond to the respective imaging positions. Then, an approximate plane, which is represented as one plane in the three-dimensional coordinate system having an X axis, a Y axis, and a Z axis when Z coordinates where a focusing degree is highest corresponding to the respective positions in the screens are plotted in an X-Y plane, is calculated. This approximate plane is an approximate image-formation plane, and is expressed by, for example, the expression "$aX+bY+cZ+d=0$" (a to d are arbitrary constants).

Since the details of a method of calculating the approximate image-formation plane are disclosed in, for example, JP2010-21985A, JP2010-21985A may be referred to as necessary.

Next, the control unit drives the chuck hand 115, which holds the imaging element unit 13, to make the imaging face of the imaging element correspond to the obtained approximate image-formation plane (S4). That is, the control unit adjusts the position and the posture of the imaging element unit 13 by changing the positions of the imaging element unit 13 in the X, Y, and Z directions and the rotation angles of θx and θy of the imaging element unit 13 while the imaging element unit 13 is held by the chuck hand 115.

After the control unit aligns the lens unit 11 with the imaging element unit 13 as described above, the control unit supplies an ultraviolet curable adhesive to a gap between the lens unit 11 and the imaging element unit 13 (S5) and turns on an ultraviolet lamp (S6). When the ultraviolet curable adhesive is cured, the lens unit 11 and the imaging element unit 13 are fixed to each other at adjusted positions and postures.

The lens unit 11 and the imaging element unit 13, which are fixed to each other, are detached from the imaging module-manufacturing apparatus (S7), so that the imaging module is completed.

In the imaging module-manufacturing apparatus, the lens axis of the lens unit 11 is set to the horizontal direction. In this case, the Ax-direction VCM 41 is hardly affected by gravity. However, when the moving direction of the X-direction VCM 45 corresponds to the vertical direction, the X-direction VCM 45 is affected by gravity and the lens group 15 is moved down in the vertical direction. Further, when the moving direction of the Y-direction VCM 49 corresponds to the vertical direction, the Y-direction VCM 49 is affected by gravity and the lens group 15 is moved down in the vertical direction. Furthermore, when the moving directions of the X-direction VCM 45 and the Y-direction VCM 49 are directions other than the vertical direction and the horizontal direction, the X-direction VCM 45 and the Y-direction VCM 49 are affected by gravity and lens group 15 is moved in the vertical direction.

For this reason, the control unit drives only one or two VCMs, which are affected by gravity, to lift the lens group 15, which is moved down, in the vertical direction. In this case, an optical axis is adjusted with high accuracy without the influence of gravity. Further, since wires corresponding to VCMs, which do not need to be driven, do not need to be provided, it is possible to simplify the structure of the imaging module by minimizing the number of wires of the second wiring portion EW2.

Particularly, in the above-mentioned case, the imaging module-manufacturing apparatus supports the lens unit 11 and the imaging element unit 13 in the same postures as the postures of the lens unit and the imaging element unit when a user picks up an image by using an imaging module formed as a product. That is, the lens axis of the lens unit 11 is parallel to the Z axis and the driving direction of the lens barrel driven by the X-direction VCM is parallel to the horizontal direction. In this case, the Ax-direction VCM and the X-direction VCM are not affected by gravity and only the Y-direction VCM is affected by gravity. Accordingly, since the movement of the lenses performed by each drive unit during adjustment is subjected to the same influence as the influence of gravity that is applied during the use of a product, more highly accurate adjustment can be performed.

When the imaging module-manufacturing apparatus sets the lens axis Ax of the lens unit 11 to the vertical direction, the X-direction VCM 45 and the Y-direction VCM 49 are set in a horizontal plane. For this reason, the X-direction VCM 45 and the Y-direction VCM 49 are hardly affected by gravity, but the Ax-direction VCM 41 is affected by gravity and the lens group 15 is moved down in the vertical direction. Accordingly, while the control unit drives at least the Ax-direction VCM 41 to lift the lens group 15, which is moved down, in the vertical direction, the control unit performs focus adjustment.

Of course, when the X-direction VCM 45 and the Y-direction VCM 49 are inclined with respect to the horizontal direction due to a slight error of the set position and are thus affected by gravity, the control unit may drive the X-direction VCM 45 and the Y-direction VCM 49 to remove the influence of gravity. In this case, a more accurate adjustment of the optical axis is performed.

Further, when the X-direction VCM 45 and the Y-direction VCM 49 are not driven and only the Ax-direction VCM 41 is driven, the second wiring portion EW2 can be limited to the wire of at least only a VCM that needs to be driven. That is, it is possible to simplify the structure of the imaging module 100 by minimizing the number of wires of the above-mentioned second wiring portion EW2.

Meanwhile, the imaging module-manufacturing apparatus and the method of manufacturing the imaging module are exemplary, and the lens unit 11 and the imaging element unit 13 may be fixed to each other by other apparatuses and other manufacturing methods.

The above-mentioned imaging module is supported by a support member, such as a board (not shown), and is disposed in a housing of an electronic apparatus, such as a digital camera or an in-vehicle camera, and is provided as an imaging device. Examples of an object in which the imaging module is assembled include electronic apparatuses, such as a camera for a PC built into a PC (Personal Computer) or provided outside a PC, an interphone with a camera, and a portable terminal device having an imaging function, other than the above-mentioned electronic apparatus. Examples of the portable terminal device include a mobile phone, a smartphone, a PDA (Personal Digital Assistants), a portable game machine, a wristwatch-type terminal, and a glass-type terminal that is worn on the head and includes displays provided on lenses of the glasses.

The invention is not limited to the above-mentioned embodiment. Modifications and applications, which are made by those skilled in the art on the basis of the combinations of the respective components of the embodiment, the description of this specification, and well-known techniques, are also planned from the invention and are included in the claims to be protected.

For example, the element fixing board 31 may be a joined body including a fixing board on which the imaging element 27 is mounted and a flexible printed circuit that is connected to the fixing board by an anisotropic conductive film (ACF) or the like, other than the board on which the imaging element 27 is mounted. Further, the element fixing board 31 may be a board where an imaging element is disposed at a cut portion or a notched portion and is integrated.

As described above, this specification discloses the following.

(1) An imaging module including:
  a lens unit that includes a lens group; and
  an imaging element unit that is fixed to the lens unit and includes an imaging element,
  wherein the lens unit includes
    a focus drive unit that drives at least a part of a plurality of lenses of the lens group in a direction of an optical axis of the lens group,
    a first image blur-correction drive unit that drives at least a part of the plurality of lenses of the lens group in a first direction present in a plane perpendicular to the direction of the optical axis of the lens group,
    a second image blur-correction drive unit that drives at least a part of the plurality of lenses of the lens group in a second direction crossing the first direction present in the plane perpendicular to the direction of the optical axis of the lens group,
    a first connecting portion that is electrically connected to the imaging element unit,
    a first wiring portion that electrically connects the focus drive unit, the first image blur-correction drive unit, and the second image blur-correction drive unit to the first connecting portion,
    a second wiring portion that is electrically connected to only a part of a plurality of wires of the first wiring portion, and
    a plurality of second connecting portions that are electrically connected to the second wiring portion.

(2) The imaging module according to (1), further including:
  a housing that houses the focus drive unit, the first image blur-correction drive unit, and the second image blur-correction drive unit therein,
  wherein the plurality of second connecting portions are disposed outside the housing.

(3) The imaging module according to (2),
  wherein the second connecting portions are coated with an insulating material.

(4) The imaging module according to any one of (2) and (3), further including: a cover member that covers the outside of the plurality of second connecting portions.

(5) The imaging module according to any one of (2) to (4), further including: a wiring board that includes at least a part of the plurality of second connecting portions and the second wiring portion,
  wherein a region of the wiring board in which the plurality of second connecting portions are disposed is disposed outside the housing.

(6) The imaging module according to (5),
  wherein the wiring board includes a flexible printed circuit.

(7) The imaging module according to (6),
  wherein the wiring board includes a terminal pattern region in which the second connecting portions are disposed, and
  the terminal pattern region is fixed to an outer surface of the housing.

(8) The imaging module according to (7),
  wherein the wiring board includes the terminal pattern regions at a plurality of portions thereof, and
  the plurality of terminal pattern regions are fixed to a plurality of outer surfaces of the housing, respectively.

(9) The imaging module according to (7) or (8), further including:
  a reinforcing member that is disposed on a back side of an exposed surface of the wiring board, to which the plurality of second connecting portions are exposed, so as to be integrated with the wiring board.

(10) The imaging module according to any one of (7) to (9),
  wherein a thickness of a wall of the housing, which includes the outer surface to which the plurality of second connecting portions are fixed, is thicker than a thickness of a wall of the housing that includes an outer surface to which the plurality of second connecting portions are not fixed.

(11) The imaging module according to any one of (5) to (10), wherein the wiring board includes at least a part of the first wiring portion, and the second wiring portion is used as at least a part of the first wiring portion.

(12) The imaging module according to any one of (5) to (10), wherein the wiring board includes at least a part of the first wiring portion, and the second wiring portion includes a portion branched from the first wiring portion.

(13) The imaging module according to any one of (2) to (12),
  wherein the second wiring portion is electrically connected to only one of the focus drive unit, the first image blur-correction drive unit, and the second image blur-correction drive unit that drive at least a part of the lenses in any one direction of the direction of the optical axis, the first direction, and the second direction.

(14) The imaging module according to any one of (2) to (13),
  wherein the plurality of second connecting portions are disposed on a side surface of the housing so as to be arranged in multiple rows in a direction of a long side of the side surface.

(15) The imaging module according to (14),
  wherein the second connecting portions are disposed so that a difference between C and D is minimum when "C=A/(N/M)" and "D=B/M" are satisfied.
  A: a length (mm) of a long side of the surface on which the plurality of second connecting portions are disposed
  B: a length (mm) of a short side of the surface on which the plurality of second connecting portions are disposed
  C: a length (mm) of one side of a rectangular region in which one of the second connecting portions is disposed
  D: a length (mm) of a side, which is connected to the side of C, of the rectangular region in which one of the second connecting portions is disposed
  N: the number of the plurality of second connecting portions M: the number of the rows of the plurality of second connecting portions

(16) The imaging module according to any one of (1) to (15), wherein a pixel pitch of the imaging module is 1 μm or less.

(17) An electronic apparatus on which the imaging module according to any one of (1) to (16) is mounted.

EXPLANATION OF REFERENCES

11: lens unit
13: imaging element unit
15: lens group
19: lens drive device
19A: focus drive device
19B: image blur correction-drive device
21: flexible printed circuit (wiring board)
23: housing
23b: side surface
26: reinforcing member
27: imaging element
31: element fixing board
37A: unit connecting section (first connecting portion)
37B: unit connecting section
59: adjustment terminal (second connecting portion)
63: adjustment terminal portion
65: insulating material
67: cover member
69A2, 69B1, 69B2: terminal pattern region
100: imaging module
EW1: first wiring portion
EW2: second wiring portion

What is claimed is:

1. An imaging module comprising:
a lens unit that includes a lens group; and
an imaging element unit that is fixed to the lens unit and includes an imaging element,
wherein the lens unit includes
a focus drive unit that drives at least a part of a plurality of lenses of the lens group in a direction of an optical axis of the lens group,
a first image blur-correction drive unit that drives at least a part of the plurality of lenses of the lens group in a first direction present in a plane perpendicular to the direction of the optical axis of the lens group,
a second image blur-correction drive unit that drives at least a part of the plurality of lenses of the lens group in a second direction crossing the first direction present in the plane perpendicular to the direction of the optical axis of the lens group,
a first connecting portion that is electrically connected to the imaging element unit,
a first wiring portion that electrically connects the focus drive unit, the first image blur-correction drive unit, and the second image blur-correction drive unit to the first connecting portion,
a second wiring portion that is electrically connected to only a part of a plurality of wires of the first wiring portion,
a plurality of second connecting portions that are electrically connected to the second wiring portion, and
a housing that houses the focus drive unit, the first image blur-correction drive unit, and the second image blur-correction drive unit therein,
the plurality of second connecting portions are disposed outside the housing,
the imaging module comprises a wiring board that includes at least a part of the plurality of second connecting portions and the second wiring portion,
a region of the wiring board in which the plurality of second connecting portions are disposed is disposed outside the housing,
the wiring board includes a flexible printed circuit, and includes a terminal pattern region in which the plurality of second connecting portions are disposed, and
the terminal pattern region is fixed to an outer surface of the housing.

2. The imaging module according to claim 1,
wherein the wiring board includes the terminal pattern regions at a plurality of portions thereof, and
the plurality of terminal pattern regions are fixed to a plurality of outer surfaces of the housing, respectively.

3. The imaging module according to claim 2, further comprising:
a reinforcing member that is disposed on a back side of an exposed surface of the wiring board, to which the plurality of second connecting portions are exposed, so as to be integrated with the wiring board.

4. The imaging module according to claim 3,
wherein a thickness of a wall of the housing, which includes the outer surface to which the plurality of second connecting portions are fixed, is thicker than a thickness of a wall of the housing that includes an outer surface to which the plurality of second connecting portions are not fixed.

5. The imaging module according to claim 2,
wherein a thickness of a wall of the housing, which includes the outer surface to which the plurality of second connecting portions are fixed, is thicker than a thickness of a wall of the housing that includes an outer surface to which the plurality of second connecting portions are not fixed.

6. The imaging module according to claim 1, further comprising:
a reinforcing member that is disposed on a back side of an exposed surface of the wiring board, to which the plurality of second connecting portions are exposed, so as to be integrated with the wiring board.

7. The imaging module according to claim 6,
wherein a thickness of a wall of the housing, which includes the outer surface to which the plurality of second connecting portions are fixed, is thicker than a thickness of a wall of the housing that includes an outer surface to which the plurality of second connecting portions are not fixed.

8. The imaging module according to claim 1,
wherein a thickness of a wall of the housing, which includes the outer surface to which the plurality of second connecting portions are fixed, is thicker than a thickness of a wall of the housing that includes an outer surface to which the plurality of second connecting portions are not fixed.

9. The imaging module according to claim 1,
wherein the plurality of second connecting portions are disposed on a side surface of the housing so as to be arranged in multiple rows in a direction of a long side of the side surface.

10. The imaging module according to claim 9,
wherein when A denotes a length of a long side of the surface on which the plurality of second connecting portions are disposed, B denotes a length of a short side of the surface on which the plurality of second connecting portions are disposed, C denotes a length of one side of a rectangular region in which one of the second connecting portions is disposed, D denotes a length of a side, which is connected to the side of C, of the rectangular region in which one of the second connecting portions is disposed, N denotes the number of the plurality of second connecting portions, and M denotes the number of the rows of the plurality of second connecting portions, the second connecting portions are disposed so that C/D is in the range of 0.4 to 2.8 in a case in which "C=A/(N/M)" and "D=B/M" are satisfied.

11. The imaging module according to claim 1, wherein the wiring board includes at least a part of the first wiring portion, and the second wiring portion is used as at least a part of the first wiring portion.

12. The imaging module according to claim 1, wherein the wiring board includes at least a part of the first wiring portion, and the second wiring portion includes a portion branched from the first wiring portion.

13. The imaging module according to claim 1, wherein the second wiring portion is electrically connected to only one of the focus drive unit, the first image blur-correction drive unit, and the second image blur-correction drive unit that drive at least a part of the lenses in any one direction of the direction of the optical axis, the first direction, and the second direction.

14. The imaging module according to claim 1, wherein a pixel pitch of the imaging module is 1 µm or less.

15. An electronic apparatus on which the imaging module according to claim 1 is mounted.

16. An imaging module comprising:
a lens unit that includes a lens group; and
an imaging element unit that is fixed to the lens unit and includes an imaging element,
wherein the lens unit includes
a focus drive unit that drives at least a part of a plurality of lenses of the lens group in a direction of an optical axis of the lens group,
a first image blur-correction drive unit that drives at least a part of the plurality of lenses of the lens group in a first direction present in a plane perpendicular to the direction of the optical axis of the lens group,
a second image blur-correction drive unit that drives at least a part of the plurality of lenses of the lens group in a second direction crossing the first direction present in the plane perpendicular to the direction of the optical axis of the lens group,
a first connecting portion that is electrically connected to the imaging element unit,
a first wiring portion that electrically connects the focus drive unit, the first image blur-correction drive unit, and the second image blur-correction drive unit to the first connecting portion,
a second wiring portion that is electrically connected to only a part of a plurality of wires of the first wiring portion,
a plurality of second connecting portions that are electrically connected to the second wiring portion, and
a housing that houses the focus drive unit, the first image blur-correction drive unit, and the second image blur-correction drive unit therein, and
the plurality of second connecting portions are disposed outside the housing and are disposed on a side surface of the housing so as to be arranged in multiple rows in a direction of a long side of the side surface.

17. The imaging module according to claim 16, wherein when A denotes a length of a long side of the surface on which the plurality of second connecting portions are disposed, B denotes a length of a short side of the surface on which the plurality of second connecting portions are disposed, C denotes a length of one side of a rectangular region in which one of the second connecting portions is disposed, D denotes a length of a side, which is connected to the side of C, of the rectangular region in which one of the second connecting portions is disposed, N denotes the number of the plurality of second connecting portions, and M denotes the number of the rows of the plurality of second connecting portions, the second connecting portions are disposed so that C/D is in the range of 0.4 to 2.8 in a case in which "C=A/(N/M)" and "D=B/M" are satisfied.

18. The imaging module according to claim 16, wherein a pixel pitch of the imaging module is 1 µm or less.

19. An electronic apparatus on which the imaging module according to claim 16 is mounted.

* * * * *